United States Patent
Wang (10) Patent No.: US 11,024,257 B2
(45) Date of Patent: Jun. 1, 2021

(54) ANDROID PLATFORM BASED DISPLAY DEVICE AND IMAGE DISPLAY METHOD THEREOF

(71) Applicant: MStar Semiconductor, Inc., Hsinchu Hsien (TW)

(72) Inventor: Jing Bin Wang, Shanghai (CN)

(73) Assignee: MEDIATEK INC., Hsinchu (TW)

( * ) Notice: Subject to any disclaimer, the term of this patent is extended or adjusted under 35 U.S.C. 154(b) by 187 days.

(21) Appl. No.: 16/115,631

(22) Filed: Aug. 29, 2018

(65) Prior Publication Data
US 2019/0080667 A1 Mar. 14, 2019

(30) Foreign Application Priority Data

Sep. 14, 2017 (CN) .......................... 201710825217.X (51) Int. Cl.
| | |
|---|---|
| *G09G 5/08* | (2006.01) |
| *G06F 3/0354* | (2013.01) |
| *G09G 5/00* | (2006.01) |
| *G09G 5/373* | (2006.01) |
| *G06F 3/038* | (2013.01) |

(52) U.S. Cl.
CPC ............... *G09G 5/08* (2013.01); *G06F 3/038* (2013.01); *G06F 3/03543* (2013.01); *G09G 5/005* (2013.01); *G09G 5/373* (2013.01); *G09G 2340/0407* (2013.01); *G09G 2340/14* (2013.01); *G09G 2354/00* (2013.01)

(58) Field of Classification Search
CPC .......... G09G 5/08; G09G 5/005; G09G 5/373; G09G 2340/0407; G09G 2354/00; G09G 2340/14; G06F 3/038; G06F 3/03543
See application file for complete search history.

(56) References Cited

U.S. PATENT DOCUMENTS

| | | | | |
|---|---|---|---|---|
| 5,298,890 A | * | 3/1994 | Kanamaru | .......... G06F 3/04842 345/157 |
| 5,633,657 A | * | 5/1997 | Falcon | ..................... G06F 3/038 345/157 |

(Continued)

FOREIGN PATENT DOCUMENTS

| | | |
|---|---|---|
| CN | 101783122 A | 7/2010 |
| CN | 102077600 | 5/2011 |

(Continued)

*Primary Examiner* — Carolyn R Edwards
(74) *Attorney, Agent, or Firm* — McClure, Qualey & Rodack, LLP (57) ABSTRACT

An image display method of an Android platform based display device includes: monitoring the state of a mouse coupled to the display device to acquire a corresponding mouse event; creating a mouse cursor layer according to the acquired mouse event, and reporting a processing request of the mouse cursor layer to an upper level; and having a processor of the display device enable an auxiliary processing thread in response to the processing request of the mouse cursor layer to process the processing request of the mouse cursor layer so as to display a corresponding mouse cursor on a display screen of the display device. The image display method and the display method of the present invention effectively increase the response speed for a mouse cursor event, preventing lagging in displaying a mouse cursor and enhancing user experience.

17 Claims, 8 Drawing Sheets

(56) References Cited

U.S. PATENT DOCUMENTS

| | | | | |
|---|---|---|---|---|
| 6,064,405 A * | 5/2000 | Eng | ............ | G06T 1/60 345/162 |
| 6,259,432 B1 * | 7/2001 | Yamada | ............ | G06F 3/038 345/159 |
| 6,392,675 B1 * | 5/2002 | Becker | ............ | G06F 3/04812 715/856 |
| 6,509,889 B2 * | 1/2003 | Kamper | ............ | G06F 3/038 345/157 |
| 8,488,869 B2 | 7/2013 | Limonov | | |
| 8,497,843 B2 * | 7/2013 | Nose | ............ | G09G 5/377 345/173 |
| 2002/0130838 A1 * | 9/2002 | Feierbach | ............ | G06F 3/04892 345/157 |
| 2004/0150619 A1 * | 8/2004 | Baudisch | ............ | G09G 5/08 345/157 |
| 2010/0117962 A1 * | 5/2010 | Westerman | ............ | G06F 3/04883 345/163 |
| 2012/0254892 A1 * | 10/2012 | Grabowski | ............ | G06F 9/542 719/318 |
| 2014/0002361 A1 * | 1/2014 | Ballard | ............ | G09G 5/12 345/163 |
| 2016/0216782 A1 * | 7/2016 | Lin | ............ | G06F 3/0484 |

FOREIGN PATENT DOCUMENTS

| | | |
|---|---|---|
| CN | 102077600 A | 5/2011 |
| CN | 102298455 | 12/2011 |
| CN | 102298491 | 12/2011 |
| CN | 102298491 A | 12/2011 |
| CN | 103984529 | 8/2014 |
| CN | 103984529 A | 8/2014 |
| TW | 201308131 | 2/2013 |
| WO | 2006/126042 A1 | 11/2006 |

* cited by examiner

ANDROID PLATFORM BASED DISPLAY DEVICE AND IMAGE DISPLAY METHOD THEREOF

This application claims the benefit of China application Serial No. 201710825217.X, filed Sep. 14, 2017, the subject matter of which is incorporated herein by reference.

BACKGROUND OF THE INVENTION

Field of the Invention

The invention relates to the field of image display, and more particularly to an Android platform based display device and an image display method thereof.

Description of the Related Art

With the constant development in technologies, an Android operation platform is no longer limited to a small-size portable smart terminal device, and is extensively applied in mid-size and large-size display devices, such as apparatuses including televisions and tablet computers, providing these mid-size and large-size display devices with richer and more versatile function applications. In these mid-size and large-size display devices, conventional touch means popular in small-size portable smart terminal devices no longer satisfies operation control requirements of individuals. Thus, there are numerous mid-size and large-size display devices further equipped with a mouse conventionally applied to a computer device. With the operation convenience of a mouse, these mid-size and large-size display devices are operated so as to satisfy operation requirements of individuals and enhance user experience.

The system architecture of a computer device is completely different from that in the current popular mid-size and large-size display devices, meaning that the principle for displaying a mouse cursor on a computer device is also completely different from that for displaying a mouse cursor on a current mid-size or large-size display device. In addition, because the system architecture of the Android operating system is a mobile operating system initially designed based on a small-size portable smart terminal device, the Android platform needs to undergo a secondary development process when a mouse is applied for controlling operations of a mid-size or large-size display device, so as to enable an Android platform based display device to match the control operation of a mouse and to display a corresponding mouse cursor on the display device.

When display is performed on an Android platform based display device, the processing means for displaying a mouse cursor is similar to that of a common display image layer (also known as an on-screen display, OSD). More specifically, a surface flinger service is invoked to respectively create a mouse cursor layer (also known as a mouse sprite surface) and a display image layer, and an input manager transmits a processing request of the mouse cursor layer in an information form through a binder interface to a message queue of a processor. Similarly, the input manager also transmits a processing request of the display image layer through the binder interface to the message queue of the processor. Because the processor sequentially processes the processing requests in the message queue, each processing request needs to wait for the previous processing request to be completely processed before processing of the processing request can begin. Further, the processing request of the mouse cursor layer and the processing request of the display image layer are queued together and await to be processed. Thus, lagging in displaying a mouse cursor can be easily caused, particularly for a display device with unsatisfactory display interface performance or successive requests for processing movements of a mouse cursor, the above lagging in the movement of a mouse cursor is inevitably caused, which significantly affects user experiences.

Therefore, in view of various drawbacks of displaying a mouse cursor by a conventional image display method of an Android platform based display device, there is a need for a solution for overcoming the above issues.

SUMMARY OF THE INVENTION

It is a primary object of the present invention to provide an image display method of an Android platform based display device for effectively resolving the issue of lagging in displaying a mouse cursor in the prior art.

To solve the above technical issue, the present invention provides an image display method of an Android platform based display device. The image display method is applied to a display device, which is connected to a display screen and is coupled to a mouse. The image display method includes: monitoring the state of a mouse to acquire a corresponding mouse event; creating a mouse cursor layer according to the acquired mouse event, and reporting a processing request of the mouse cursor layer to an upper level; and having a processor of the display device enable an auxiliary processing thread in response to the processing request of the mouse cursor layer to process the processing request of the mouse cursor layer, so as to display a corresponding mouse cursor on a display screen of the display device.

To solve the above technical issue, the present invention provides an Android platform based display device, which is connected to a display screen and is coupled to a mouse. The display device includes: a monitoring circuit, monitoring the state of the mouse to acquire a corresponding mouse event; a graphics engine, connected to the monitoring circuit, creating a mouse cursor layer according to the acquired mouse event, and reporting a processing request of the mouse cursor layer to the display device; a processor, connected to the image rending engine, enabling an auxiliary processing thread in response to the processing request of the mouse cursor layer to process the processing request of the mouse cursor layer, the processor further reading source data of the mouse cursor layer from a memory, processing the source data of the mouse cursor layer and storing processed data of the mouse cursor layer in the memory; and a first image display control module, connected to the processor, reading the processed data of the mouse cursor layer from the memory so as to display a corresponding mouse cursor on the display screen.

The present invention provides the following advantages compared to the prior art. The Android platform based display device and the image display method thereof treat a mouse cursor to be displayed as a special display image, and enable an auxiliary processing thread exclusive for processing a mouse event to exclusively process a processing request of a mouse cursor layer. Thus, the processing request for processing the mouse cursor layer, instead of having to queue in order in a message queue of a main thread of a processor and await to be processed as other common processing requests of display image layers, can be directly processed by an auxiliary processing thread enabled by the processor, thereby significantly increasing the response speed for processing a mouse event, effectively resolving the issue of lagging in displaying a mouse cursor and improving user experience. Further, in the present invention, when a mouse cursor layer is processed, instead of sharing a same image display control module with other common display images, a mouse cursor can be exclusively rendered by an independent first image display control module to analogize a mouse cursor event, further increasing the response for a mouse cursor event and preventing the lagging in displaying a mouse cursor.

The above and other aspects of the invention will become better understood with regard to the following detailed description of the preferred but non-limiting embodiments. The following description is made with reference to the accompanying drawings.

DETAILED DESCRIPTION OF THE INVENTION

Specific details are given in the description below to better understand the present invention. However, the present invention may be implemented by other methods different from those describe herein, and a person skilled in the art can make similar modifications and arrangements without departing from the spirit of the present invention. Therefore, the present invention is not limited to the implementation details of the non-limiting embodiments below.

In regard to the issues of the prior art, the present invention provides an Android platform based image display method and a corresponding display device. Details of the present invention are given in the embodiments with the accompanying drawings below.

Figure 1:
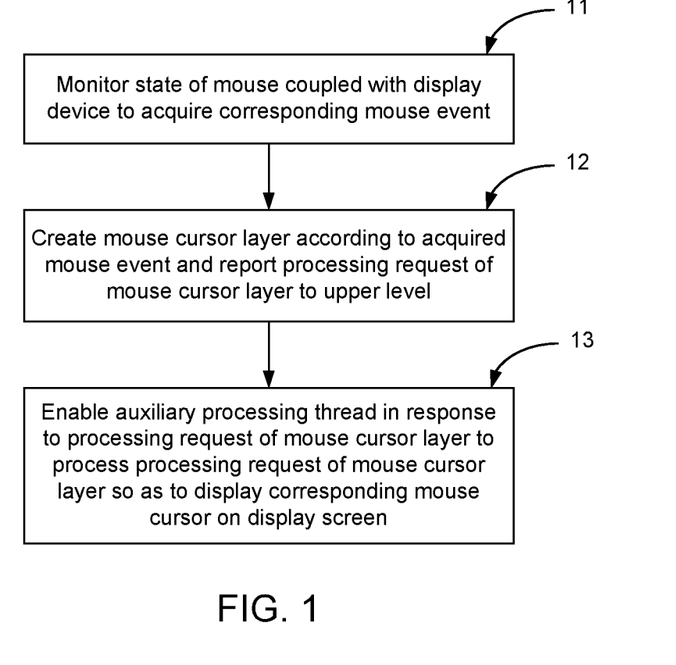
FIG. 1 is a flowchart of an image display method of an Android platform based display device according to an embodiment of the present invention.

FIG. 1 shows a flowchart of an image display method of an Android platform based display device according to an embodiment of the present invention. As shown in FIG. 1, the image display method according to the embodiment of the present invention is applied to a display device, which is connected to a screen and is coupled to a mouse. In the present invention, the display device may be a large-size or mid-size display device, such as a television, and has architecture configured on the basis of an Android platform. Thus, the display device is configured with various versatile function applications.

Further, the display device and the mouse are connected in a wired or wireless manner, e.g., a Bluetooth connection, to implement the communication therebetween and to use the mouse as an input device to control the display device.

The image display method according to the embodiment of the present invention includes the following steps.

In step 11, the state of the mouse is monitored to acquire a corresponding mouse event.

In step 12, a mouse cursor layer is created according to the acquired mouse event, and a processing request of a mouse cursor layer is reported to an upper level. When the display device acquires the corresponding mouse event through monitoring the status of the mouse, a mouse cursor layer is correspondingly created, data associated with the mouse cursor is duplicated to the mouse cursor layer, and the processing request of the mouse cursor layer is reported to a processor of the display device.

In step 13, an auxiliary processing thread is enabled in response to the processing request of the mouse cursor layer to process the processing request of the mouse cursor layer, so as to display a corresponding mouse cursor on the display screen.

That is to say, in the present invention, for a processing request of a mouse cursor layer, the processor of the display device exclusively enables an exclusive auxiliary processing thread for processing the mouse event, so as to exclusively process the processing request of the mouse cursor layer to further display a corresponding mouse cursor on the display screen.

Figure 2:
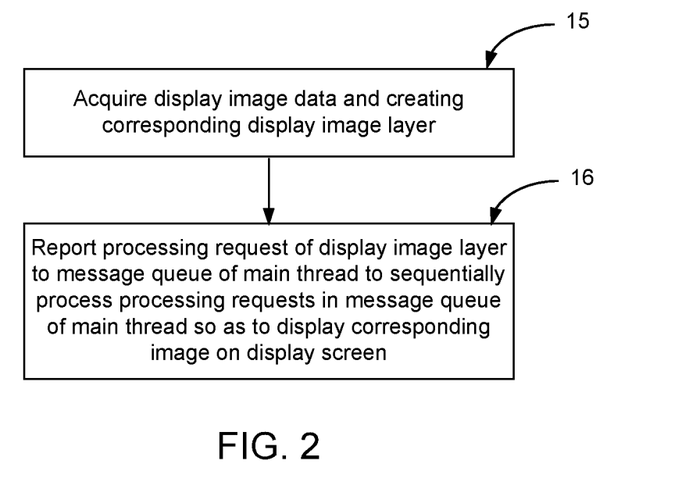
FIG. 2 is a flowchart of processing a common display image layer by an image display method of an Android platform based display device according to an embodiment of the present invention.

FIG. 2 shows a flowchart of a processing a common display image in an image display method of an Android platform based display device according to an embodiment of the present invention. As shown in FIG. 3, the image display method according to the embodiment of the present invention further comprises the following steps.

In step 15, display image data is acquired and a corresponding display image layer is created.

In step 16, a processing request of the display image layer is reported to a message queue of a main thread of the display device, so as to sequentially process the processing requests in the message queue of the main thread and to display a corresponding image on the display screen.

That is to say, in the present invention, to process a common display image, a corresponding display image layer is created, and an input manager is used to transmit the processing request of the display image layer in an information form through a binder interface to the message queue of the main thread of the processor. The processor may then sequentially process the processing requests of these display images according to the sequence of the message queue in the main thread, so as to display a corresponding image on the display screen.

Referring to FIG. 1 and FIG. 2, steps 11 to 13 in FIG. 1 are a process for processing a mouse cursor, whereas steps 15 and 16 in FIG. 2 are a process for processing a common display image. As shown in FIGS. 1 and 2, in the present invention, a processing request of a display image layer needs to queue in order in the message queue of the main thread of the processor, whereas a processing request of a mouse cursor is processed in a special manner and is not required to queue in order in the message queue of the main thread.

In the present invention, a mouse cursor is treated as a special display image. When the processor receives a processing request of a mouse cursor layer, an auxiliary processing thread for exclusively processing a mouse event is additionally and exclusively enabled to exclusively process the processing request of the mouse cursor layer. Thus, in the present invention, the processing request for processing a mouse cursor layer is not required to queue in order in the message queue of the main thread of the processor and await to be processed by the main thread of the processor as other processing requests of common image display layers, but can be processed directly by an auxiliary processing thread enabled by the processor, thereby significantly increasing the response speed, effectively resolving the issue of lagging in displaying a mouse cursor and improving user experience.

Figure 3:
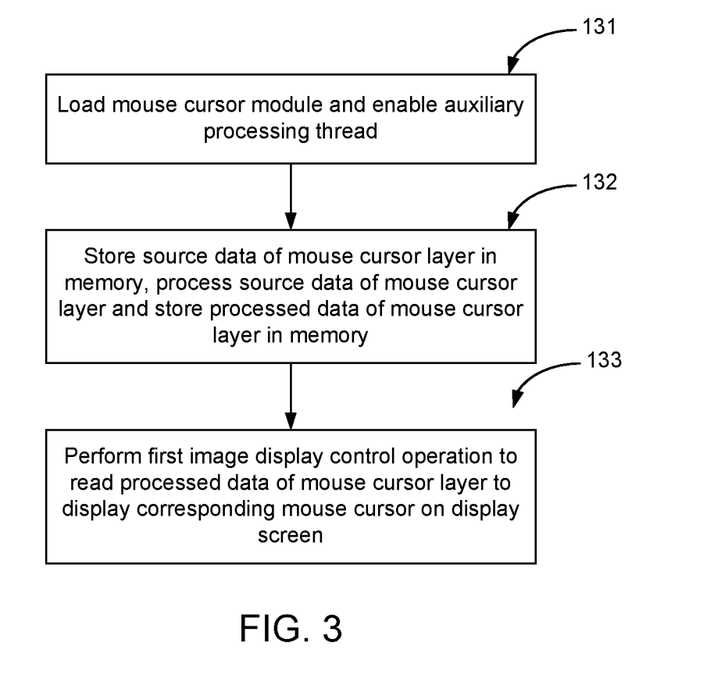
FIG. 3 is a flowchart of step 13.

FIG. 3 shows a flowchart of step 13. As shown in FIG. 3, step 13 includes the following steps.

In step 131, a mouse cursor module is loaded, and the auxiliary processing thread is enabled. In step 131, loading the mouse cursor module is enabling a mouse cursor service, and is an initialization step for a mouse cursor.

In step 132, source data of the mouse cursor layer is stored in a memory, the source data of the mouse cursor layer is processed, and processed data of the mouse cursor layer is stored in the memory.

In step 133, a first image display control operation is performed to read the processed data of the mouse cursor layer from the memory, so as to display a corresponding mouse cursor on the display screen. In the present invention, the processor renders the mouse cursor by performing the first image display control operation and by analogizing a mouse cursor event, so as to display a corresponding mouse cursor on the display screen.

Figure 4:
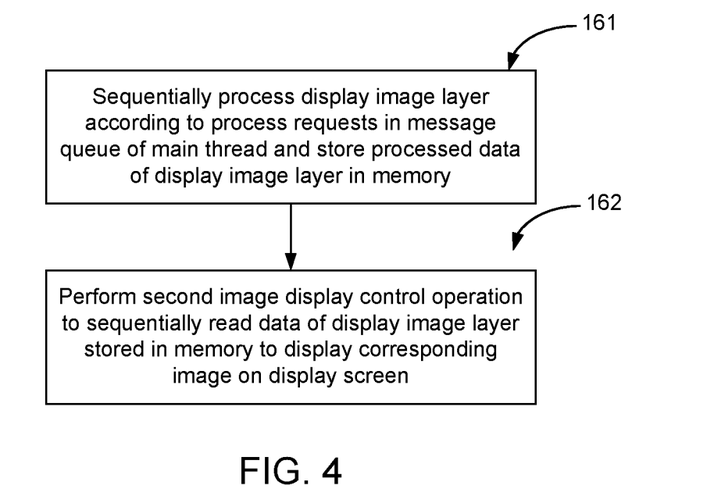
FIG. 4 is a flowchart of step 16.

FIG. 4 shows a flowchart of step 16. As shown in FIG. 4, step 16 includes the following steps.

In step 161, data of the display image layer is sequentially processed according to the processing request in the message queue of the main thread, and the processed data of the display image layer is stored in the memory.

In step 162, a second image display control operation is performed to sequentially read the data of the display image layer from the memory, so as to display the corresponding image on the display screen.

Further, in the present invention, the first image display control operation and the second image display control operation may be mutually independent, and may be respectively performed by different image display controller or performed by different control modules of the same display controller.

That is to say, in the present invention, rather than sharing the same image display control module with other common display images, an independent image display control module may be used to exclusively render a mouse cursor and analogize a mouse cursor event. Thus, the present invention is able to further increase the response speed of a mouse cursor event and prevent lagging in displaying a mouse cursor.

In the present invention, a mouse event is processed differently from a common display image. In the present invention, a mouse cursor is treated as a special display image and processed accordingly. An auxiliary processing thread for exclusively processing a mouse event is additionally enabled to exclusively process the processing request of a mouse cursor layer, and an independent image display control module is additionally used to render a mouse cursor and to analogize a mouse cursor event. Therefore, the processing of a mouse event can be made independent from the processing of a common display image, thereby effectively increasing the response speed of a mouse event and preventing the lagging in display a mouse cursor.

Specific details for processing a mouse event in the present invention are given below.

In an embodiment of the present invention, the memory may be a memory included in the display device or may be a memory outside the display device. In the present invention, an example where the memory is included in the display device is given for illustration purposes, and a person skilled in the art can understand that the above example is not to be construed as a limitation to the present invention. The memory may be configured in advance therein with three shared buffer units having a predetermined size, e.g., a storage space for data of 128×512 pixels, for exclusively storing data of a mouse cursor. More specifically, the three shared buffer units include a source buffer, a back buffer and a front buffer. The source buffer is for storing source data of a mouse cursor layer, the back buffer is for storing processed data of a mouse cursor layer generated from processing the source data of a mouse cursor layer, and the front buffer is for storing data of a currently displayed mouse cursor.

When the display screen of the display device is refreshed, the processed data of the mouse cursor layer stored in the back buffer is relocated to the front buffer to serve as data of the currently display mouse cursor, and the first image display control operation is performed to read the data of the currently displayed mouse cursor stored in the front buffer so as to display the corresponding mouse cursor on the display screen.

Figure 5:
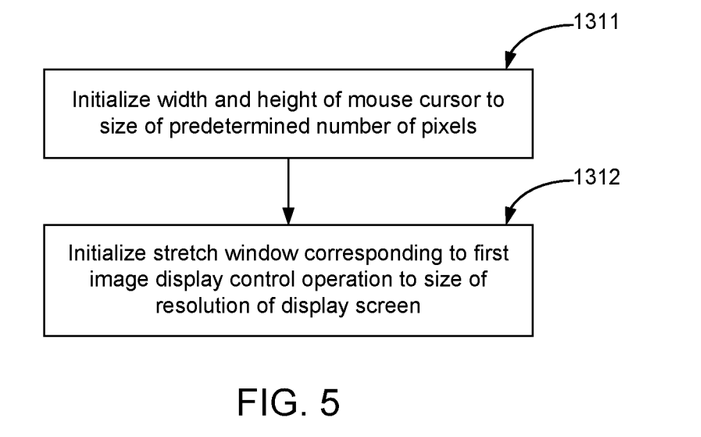
FIG. 5 is a specific flowchart of step 131.

FIG. 5 shows a specific flowchart of step 151. As shown in FIG. 5, step 131 comprises the following steps.

In step 1311, a width and a height of the mouse cursor are respectively initialized into a size of a predetermined number of pixels.

In step 1312, a stretch window corresponding to the first image display control operation is initialized into a size of the resolution of the display screen. That is to say, when initializing the mouse cursor, the width and the height of the mouse cursor may be initialized, according to a usual configuration or by invoking a previous user-configured mouse cursor configuration, to a size of a predetermined number of pixels, e.g., a size of 128 pixels, and a mouse cursor in this size is used as an initialization mouse cursor. Further, the size of the stretch window of the first image display control operation is set to correspond to the resolution of the display screen, e.g., 1920×1080; the cursor display window GWIN corresponding to the first image display control operation corresponds to the mouse cursor to be displayed, and the position of the stretch window thereof is the position at which the mouse cursor is expected to be displayed on the display screen.

Figure 6:
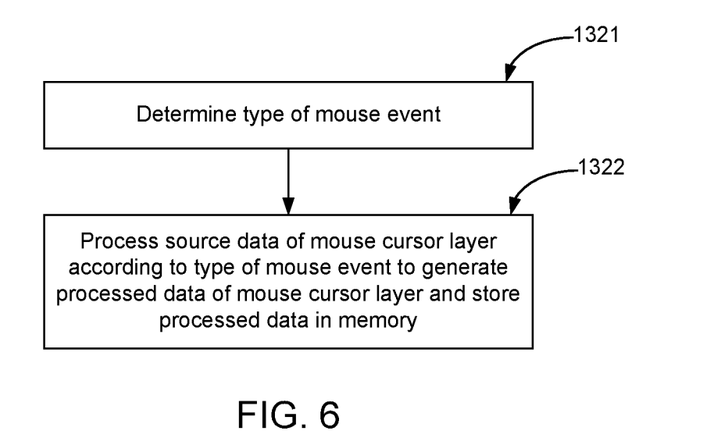
FIG. 6 is a specific flowchart of step 132.

FIG. 6 shows a specific flowchart of step 132. As shown in FIG. 6, step 132 includes following steps.

In step 1321, the type of the mouse event is determined.

In step 1322, the source data of the mouse cursor layer is processed according to the type of the mouse event to generate corresponding processed data of the mouse cursor layer, and the processed data is stored in the memory. In the present invention, types of a mouse event may include a mouse cursor changing event, a mouse cursor moving event, a mouse cursor hiding event and a mouse cursor displaying event.

Figure 7:
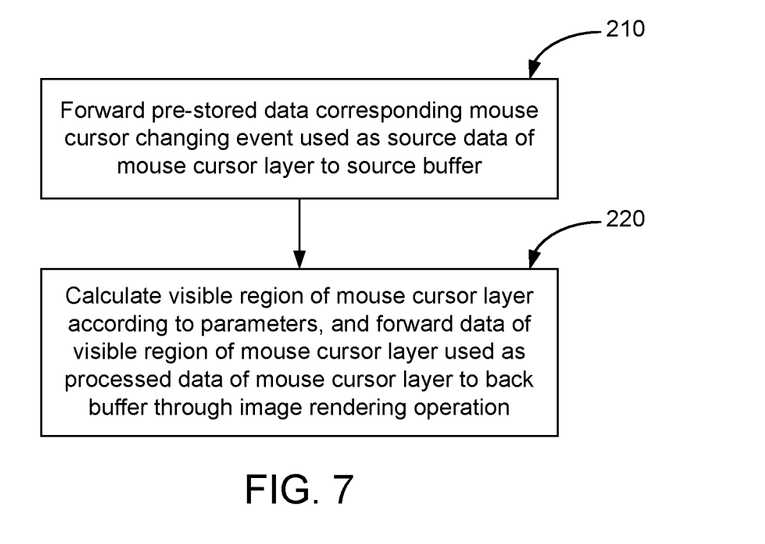
FIG. 7 is a specific flowchart of step 1322 when it is determined that the type of a mouse event is a mouse cursor changing event.

FIG. 7 shows a specific flowchart of step 1322 when it is determined that the type of the mouse event is a mouse cursor changing event. As shown in FIG. 7, when it is determined that the type of the mouse event is a mouse cursor changing event, step 1322 further includes following steps.

In step 210, pre-stored data corresponding to the mouse cursor changing event used as the source data of the mouse cursor layer is forwarded to the source buffer. The mouse cursor changing event may be a mouse cursor icon changing event, a mouse cursor size changing event or a mouse cursor display method changing event.

In step 220, a visible region of the mouse cursor layer is calculated according parameters, and data of the visible region of the mouse cursor layer used as the processed data of the mouse cursor layer is forwarded to the back buffer through an image rendering operation.

In one embodiment, the processor can calculate the visible region of the mouse cursor layer according to parameters such as position, image size and hotspot information of the changed mouse cursor, and the processor may then invoke a graphics engine to forward the data of the visible region of the mouse cursor layer used as the processed data of the mouse cursor layer to the back buffer. When the display screen is refreshed, the data of the visible region of the mouse cursor stored in the back buffer is relocated to the front buffer to serve as the data of the currently displayed mouse cursor. Next, the data of the currently displayed mouse cursor is read from the front buffer by the first image display control operation, so as to display the updated mouse cursor on the display screen.

Figure 8:
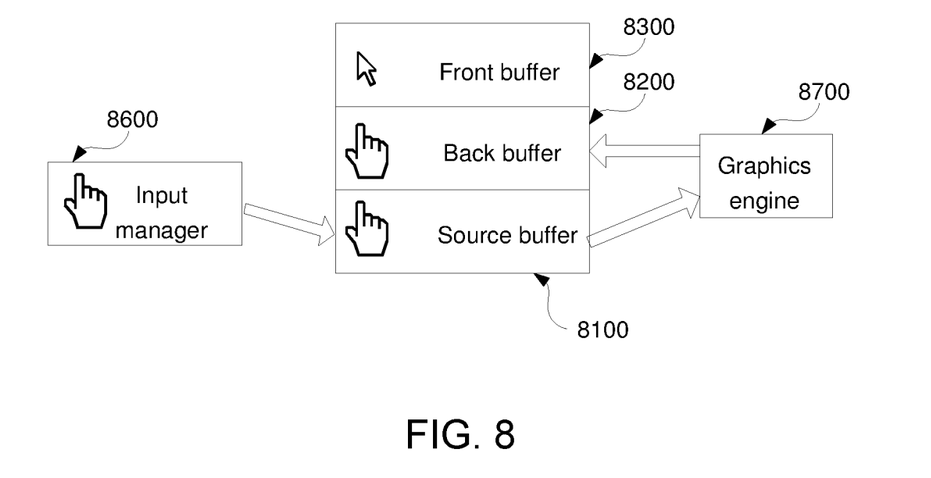
FIG. 8 is a schematic diagram of a mouse cursor changing event according to an embodiment of the present invention.

FIG. 8 shows a schematic diagram of mouse cursor updating event according to an embodiment of the present invention. As shown in FIG. 8, a front buffer 8300 of the memory stores data of the currently displayed mouse cursor. For example, the mouse cursor may be an arrow mouse cursor. When a user wishes to change the arrow mouse cursor to a palm mouse cursor, a corresponding mouse cursor changing event is triggered according to a user command. An input manager 8600 forwards pre-stored data corresponding to the palm mouse cursor selected by the user used as the source data to a source buffer 8100. The processor processes the data corresponding to the palm mouse cursor after the above change, e.g., calculating the visible region of the mouse cursor layer, and then invokes a graphics engine 8700 to forward the data of the palm mouse cursor layer used as the processed data of the mouse cursor layer through stretch bit block to a back buffer 8200 for storage. When the display screen of the display device is next refreshed, the processed data of the mouse cursor layer stored in the back buffer 8300 is relocated to the front buffer 8200, replaces the arrow mouse cursor, and is used as the data of the currently displayed mouse cursor. The data is then read from the front buffer 8300 by the first image display control operation, so as to display an icon of the updated palm mouse cursor on the display screen.

Figure 9:
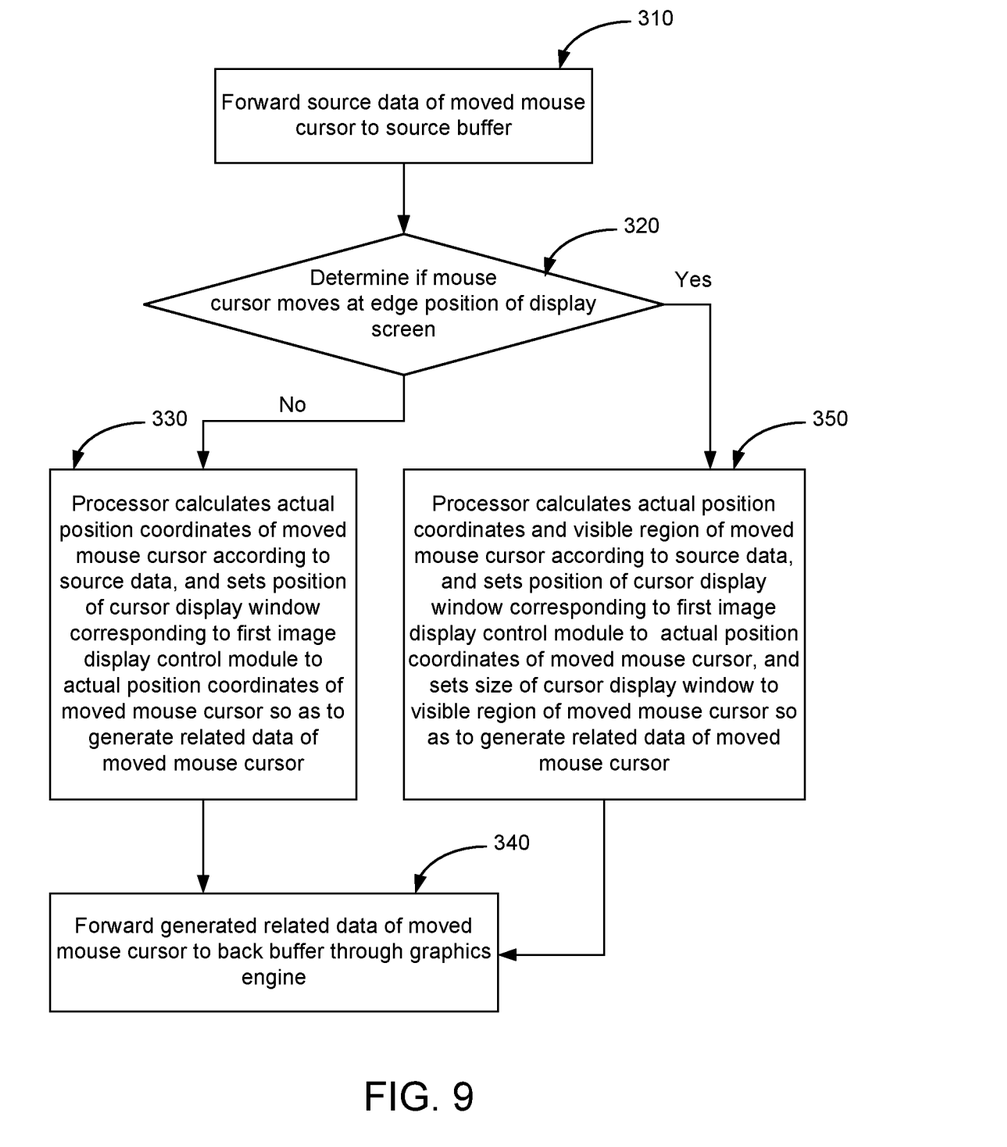
FIG. 9 is a specific flowchart of step 1322 when it is determined that the type of a mouse event is a mouse cursor moving event.

FIG. 9 shows a specific flowchart of step 1322 when it is determined that type of the mouse event is a mouse cursor moving event. As shown in FIG. 9, when it is determined that the type of the mouse event is a mouse cursor moving event, step 1322 further includes the following event.

In step 310, pre-stored data corresponding to the mouse cursor moving event used as the source data of the mouse cursor layer is forwarded to the source buffer.

In step 320, it is determined whether the mouse cursor moves at an edge position of the display screen.

In step 330, when it is determined that the mouse cursor does not move at an edge position of the display screen, actual position coordinates of the moved mouse cursor are calculated according to the source data of the mouse cursor, and the position of the cursor display window corresponding to the first image display control operation is set to the actual position coordinates of the moved mouse cursor, so as to generate related data of the moved mouse cursor.

In step 340, the generated related data of the moved mouse cursor used as the processed data of the mouse cursor is forward through the image rendering operation to the back buffer.

That is to say, when it is determined that the mouse event is a mouse cursor moving event, it is further determined whether the mouse cursor moves at an edge position of the display screen. If the mouse cursor does not move at an edge position of the screen, it means that, instead of displaying only a part of the mouse cursor image because the mouse cursor partially moves out of the range of the display screen, the mouse cursor is a complete cursor. Thus, at this point, the position of the cursor display window GWIN corresponding to the first image display control operation is set to the actual position coordinates of the moved mouse cursor. The cursor display window GWIN is then activated, and the position of the activated cursor display window GWIN is the actual position at which the mouse cursor needs to be displayed on the display screen.

Referring to FIG. 9, step 1322 further includes the following step.

In step 350, when it is determined that the mouse cursor moves at an edge position of the screen, the actual position coordinates and the visible region of the moved mouse cursor are calculated according to the source data of the mouse cursor layer, the position of the cursor display window corresponding to the first image display control operation is set to the actual position coordinates of the moved mouse cursor, and the size of the cursor display window is set to the visible region of the moved mouse cursor, so as to generate the related data of the moved mouse cursor. Step 340 is performed after step 350 to forward the generated related data of the moved mouse cursor used as the processed data of the mouse cursor layer to the back buffer through the image rendering operation.

That is to say, when it is determined that the mouse cursor moves at an edge position of the display screen, it means that it is likely that a part of the mouse cursor image has moved out of the range of the display screen while the mouse cursor moves. Thus, at this point, the actual position of the mouse cursor as well as the visible region of the mouse cursor need to be calculated, i.e., the mouse cursor image for the part that has not yet moved out of the range of the display screen needs to be calculated. After acquiring the related data, the related data of the moved mouse cursor is forwarded to the back buffer through the image rendering operation.

After the related data of the moved mouse cursor is forwarded to the back buffer of the memory, when the display screen is next refreshed, the related data of the moved mouse cursor stored in the back buffer is relocated to the front buffer in the memory to serve as the data of the currently displayed mouse cursor. The first image display control module then reads the data stored in the front buffer so as to display the moved mouse cursor on the display screen.

Further, a person skilled in the art can understand that, while moving the mouse cursor, the display device continuously collects and monitors the moving status of the mouse according to a predetermined frequency, so as to continuously generate a mouse cursor moving events, and a motion trajectory of the mouse cursor can be displayed on the display screen by continuously processing these mouse cursor moving events.

Figure 10:
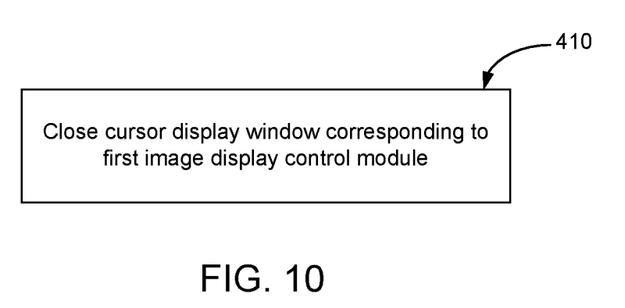
FIG. 10 is a specific flowchart of step 1322 when it is determined that the type of a mouse event is a mouse cursor hiding event.

FIG. 10 shows a specific flowchart of step 1322 when it is determined that the type of the mouse event is a mouse cursor hiding event. As shown in FIG. 10, when it is determined that the type of the mouse event is a mouse cursor hiding event, e.g., the mouse cursor needs to hidden from the display screen when the mouse is not operated for an extended period of time, step 1322 further includes the following step.

In step 410, the cursor display window corresponding to the first image display control operation is closed.

That is to say, when the mouse is not operated for an extended period of time and the mouse cursor needs to be hidden from the display screen, the cursor display window GWIN corresponding to the first image display control module can be directly closed, and the display cursor is correspondingly no longer displayed on the display screen.

Figure 11:
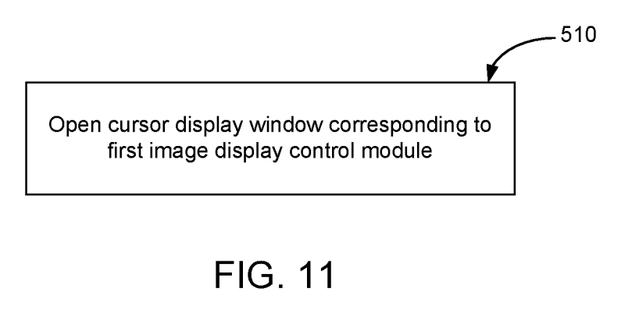
FIG. 11 is a specific flowchart of step 1322 when it is determined that the type of a mouse event is a mouse cursor displaying event.

FIG. 11 shows a specific flowchart of step 1322 when it is determined that the mouse event is a mouse cursor displaying event. As shown in FIG. 11, when it is determined that the mouse event is a mouse cursor displaying event, step 1322 further includes the following step.

In step 510, the cursor display window corresponding to the first image display control operation is opened.

For example, when the mouse cursor in a hidden state is again triggered and needs to be again displayed on the display screen, the cursor display window GWIN corresponding to the first image display control module can be opened to again display the mouse cursor on the display screen.

A person skilled in the art can understand that, a mouse cursor displaying event and a mouse cursor moving event or a mouse cursor moving event can be combined. For example, if a mouse cursor changing event or a mouse cursor moving event occurs after a mouse cursor hiding event, the occurrence of a mouse cursor changing event of a mouse cursor moving event necessarily triggers the occurrence of a mouse cursor displaying event. At this point, in addition to again displaying the mouse cursor, the mouse cursor changing event or the mouse cursor moving event is further processed.

Further, as most display devices (e.g., a large-size television) support a 3D display mode, the mouse cursor also needs to be displayed in a 3D mode when a display device operates in a 3D display mode so as to match the operation mode of the display device.

Figure 12:
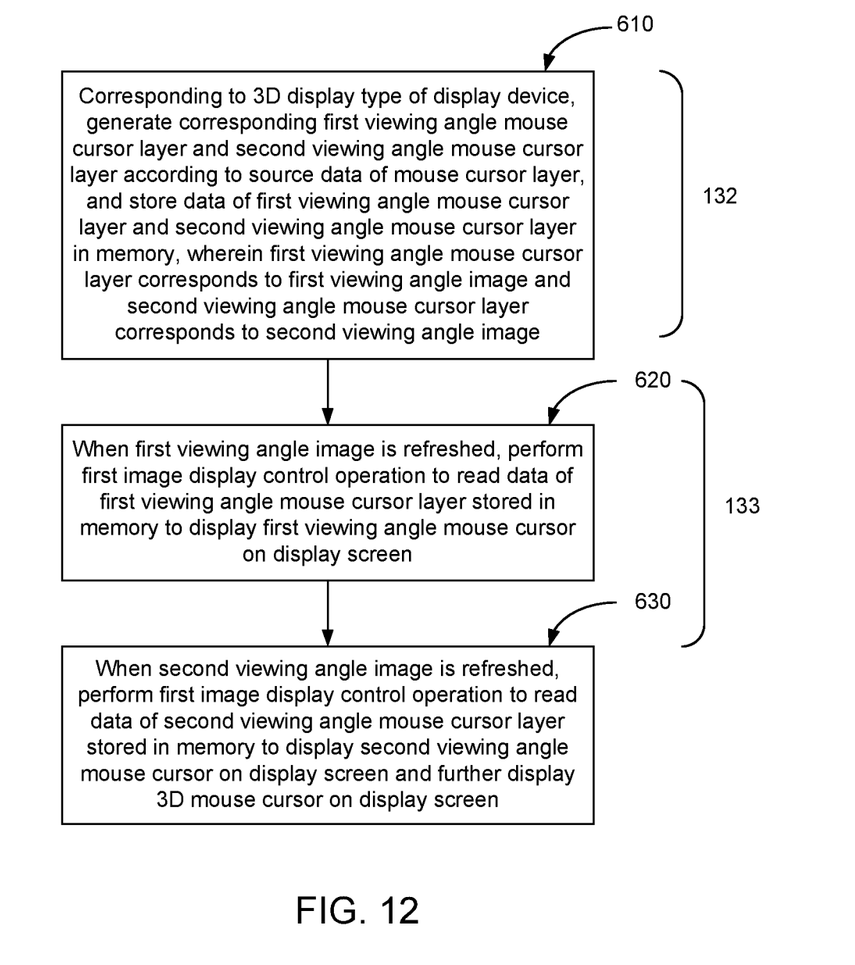
FIG. 12 is a specific flowchart of an image display method in a 3D display mode according to an embodiment of the present invention.

FIG. 12 shows a specific flowchart of an image display method in a 3D display mode according to an embodiment of the present invention. As shown in FIG. 12, when the display device operates in a 3D display device, step 132 in FIG. 3 further includes the following step.

In step 610, corresponding to a 3D display type of the display device, a first viewing angle mouse cursor layer and a second viewing angle mouse cursor layer are correspondingly generated according to the source data of the mouse cursor layer, and data of the first viewing angle mouse cursor layer and the second viewing angle mouse cursor layer is stored in the memory. Wherein, the first viewing angle mouse cursor layer corresponds to a first viewing angle image and the second viewing angle mouse cursor layer corresponds to a second viewing angle image.

Step 133 in FIG. 3 further includes the following steps.

In step 620, when the first viewing angle image is refreshed, the first image display control operation is performed to read the data of the first viewing angle mouse cursor layer stored in the memory, so as to display a first viewing angle mouse cursor on the display screen.

In step 630, when the second viewing angle image is refreshed, the first image display control operation is performed to read the data of the second viewing angle mouse cursor layer stored in the memory, so as to display a second viewing angle mouse cursor on the display screen and to further display a 3D mouse cursor on the display screen.

That is to say, in the embodiment of the present invention, when the display device operates in a 3D display mode, image processing of the mouse cursor is similar to the image processing of the display device for 3D display, i.e., processing the mouse cursor into a first viewing angle mouse cursor layer and a second viewing angle mouse cursor layer. Thus, when the display device refreshes the first viewing angle image or the second viewing angle image, the first viewing angle mouse cursor and the second viewing angle mouse cursor are displayed on the screen, so as to display a 3D mouse cursor on the display screen.

A person skilled in the art can understand that, 3D display types of current display devices are categorized into a left-right mode and a top-bottom mode. When a display device operates in a top-bottom 3D display type, the widths of the first viewing angle mouse cursor layer and the second viewing angle mouse cursor layer are equal to the width of the mouse cursor layer generated by the display device in a 2D display mode, and heights of the first viewing angle mouse cursor layer and the second viewing angle mouse cursor layer are a half of the height of the mouse cursor layer generated by the display device in a 2D display mode.

When the display device operates in the 3D display type of the left-right mode, the widths of the first viewing angle mouse cursor layer and the second viewing angle mouse cursor layer are a half of the width of the mouse cursor layer generated by the display device in a 2D display mode, and heights of the first viewing angle mouse cursor layer and the second viewing angle mouse cursor layer are equal to the height of the mouse cursor layer generated by the display device in a 2D display mode.

Figure 13:
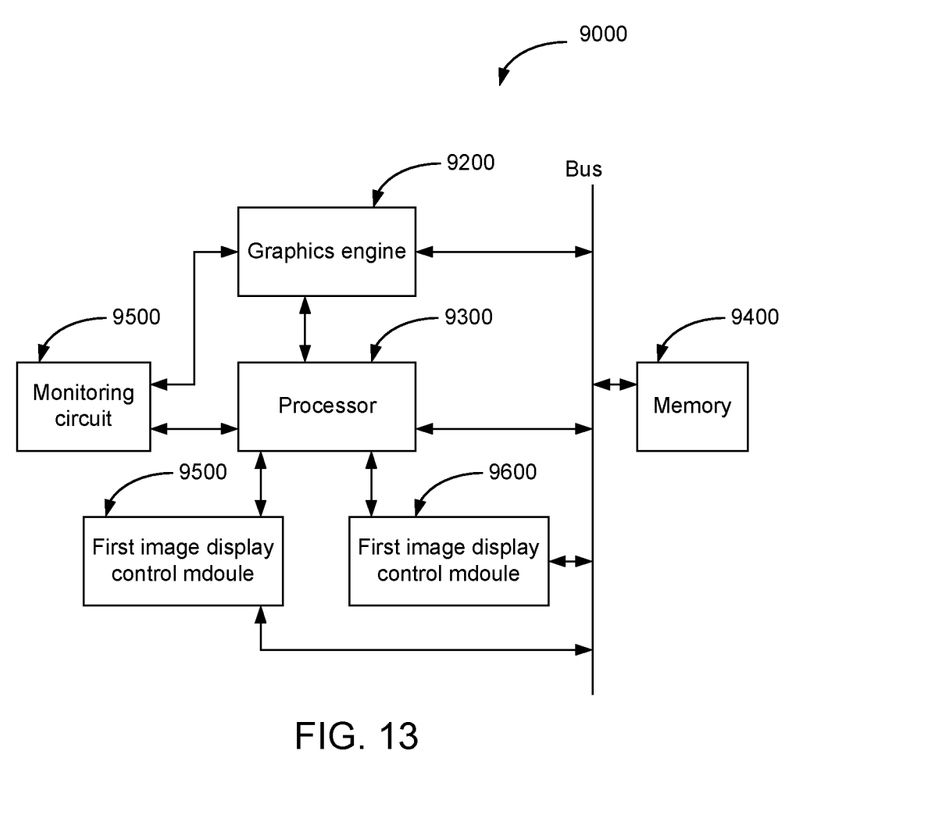
FIG. 13 is a schematic diagram of an Android platform based display device according to another embodiment of the present invention.

FIG. 13 shows a schematic diagram of an Android platform based display device according to another embodiment of the present invention. Referring to FIG. 13, the display device of the embodiment of the present invention is for executing the above image display method to display a corresponding mouse cursor on a display screen. More specifically, the display device 9000 according to the embodiment of the present invention includes a monitoring circuit 9100, a graphics engine 9200, a processor 9300, a memory 9400, a first image display control module 9500 and a second image display control module 9600. It should be noted that, a person skilled in the art can understand that, the memory 9400 may be provided in the display device 9000 or outside the display device 9000, and details depicted in FIG. 13 are for illustration purposes and are not to be construed as limitations to the present invention.

The monitoring circuit 9100 monitors the state of a mouse coupled to the display device 9000 to acquire a corresponding mouse event. The graphics engine 9200, connected to the monitoring circuit 9100, creates a mouse cursor layer according to the acquired mouse event, and reports a processing request of the mouse cursor layer to an upper level. The processor 9300, connected to the graphics engine 9200, enables an auxiliary processing thread in response to the reported processing request of the mouse cursor layer to process the processing request of the mouse cursor layer. The memory 9400 stores source data of the mouse cursor layer and processed data of the mouse cursor layer. The first image display control module 9500, connected to the processor 9300, performs a first image display control operation to read the processed data of the mouse cursor layer stored in the memory, so as to display a corresponding mouse cursor on a display screen of the display device. The memory 9400 is connected to the graphics engine 9200 and the processor 9300 through a bus.

In addition, the display device 9000 according to the embodiment of the present invention may further include a second image display control module 9600. The graphics engine 9200 further renders a display image layer according to display image data received by the display device, and reports the processing request of the display image layer to a message queue of a main thread of the processor 9300. The processor 9300 further sequentially processes the display image layer according to the processing request in the message queue of the main thread, and stores the processed data of the display image layer in the memory 9400. The second image display control module 9600 performs a second image display control operation to sequentially read the data of the display image layer stored in the memory 9400, so as to display a corresponding image on the display screen of the display device 9000. In one embodiment of the present invention, the first image display control module 9500 and the second image display control module 9600 are mutually independent, and may respectively be different image display controllers or be different control units of the same image display controller.

Further, as previously described, the memory 9400 in the embodiment of the present invention may be configured in advance with three shared buffer units in a predetermined size for storing data of the mouse cursor. More specifically, the three shared buffer units include a source buffer, a back buffer and a front buffer. The source buffer is for storing source data of a mouse cursor layer, the back buffer is for storing processed data of a mouse cursor layer generated from processing the source data of the mouse cursor layer, and the front buffer is for storing data of a currently displayed mouse cursor. When the display screen of the display device is refreshed, the processed data of the mouse cursor layer stored in the back buffer is relocated to the front buffer to serve as data of the currently display mouse cursor, and the first image display control operation is invoked to read the data of the currently displayed mouse cursor stored in the front buffer so as to display the corresponding mouse cursor on the display screen.

The display device 9000 according to the embodiment of the present invention can be used to execute the image display method shown in FIGS. 1 to 12 so as to display a corresponding mouse cursor on the display screen.

In conclusion, in the display method of an Android platform based display device and the display device of the present invention, a mouse cursor is treated as a special display image, such that the processor enables an auxiliary processing thread for exclusively processing a mouse event to exclusively process the processing request of the mouse cursor layer. Thus, the processing request for processing a mouse cursor layer is not required to queue in order in the message queue of the main thread of the processor and await to be processed by the main thread of the processor as other processing requests of common image display layers, but can be processed directly by an auxiliary processing thread enabled by the processor, thereby significantly increasing the response speed, effectively resolving the issue of lagging in displaying a mouse cursor and improving user experience. Further, in the present invention, rather than sharing the same image display control module with other common display images, an independent first image display control module may be used to exclusively render a mouse cursor to analogize a mouse cursor event. Thus, the present invention is able to further increase the response speed of a mouse cursor event and prevent lagging in displaying a mouse cursor.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An image display method of an Android platform based display device, applied to the display device connected to a display screen and coupled to a mouse, the image display method comprising:
   monitoring a state of the mouse to acquire a corresponding mouse event;
   creating a mouse cursor layer according to the acquired mouse event, and reporting a processing request of the mouse cursor layer to the display device; and
   enabling an auxiliary processing thread in response to the processing request of the mouse cursor layer to process the processing request of the mouse cursor layer so as to display a corresponding mouse cursor on the display screen;
   acquiring display image data and creating a corresponding display image layer; and
   reporting a processing request of the display image layer to a message queue of a main thread of the display device, and sequentially processing the processing requests in the message queue of the main thread so as to display a corresponding image on the display screen;
   wherein the step of enabling the auxiliary processing thread in response to the processing request of the mouse cursor layer to process the processing request of the mouse cursor layer so as to display the corresponding mouse cursor on the display screen comprises:
      loading a mouse cursor module, and enabling the auxiliary processing thread;
      storing source data of the mouse cursor layer corresponding to the mouse event in a memory, processing the source data of the mouse cursor layer, and storing processed data of the mouse cursor layer in the memory; and
      performing a first image display control operation to read the processed data of the mouse cursor layer stored in the memory so as to display the corresponding mouse cursor on the display screen.

2. The image display method according to claim 1, wherein the step of reporting the processing request of the display image layer to the message queue of the main thread of the display device, and sequentially processing the processing requests in the message queue of the main thread so as to display the corresponding image on the display screen comprises:
   sequentially processing data of the display image layer according to the processing request in the message queue of the main thread, and storing the processed data of the display image layer in the memory; and performing a second image display control operation to sequentially read the processed data of the display image layer stored in the memory so as to display the corresponding image on the display screen;

wherein, the first image display control operation and the second image display control operation are mutually independent.

3. The image display method according to claim 2, wherein the first image display control operation and the second image display control operation are performed respectively by different image display controllers or performed respectively by different control nits of a same image display controller.

4. The image display method according to claim 1, wherein the memory is configured therein in advance with three shared buffer units having a predetermined size for exclusively storing data of the mouse cursor, and the three shared buffer units comprise:

a source buffer, for storing the source data of the mouse cursor layer;

a back buffer, for storing the processed data of the mouse cursor layer generated from processing the source data of the mouse cursor layer; and a front buffer, for storing data of the currently displayed mouse cursor;

wherein, when the display screen is refreshed, the processed data of the mouse cursor layer stored in the back buffer is relocated to the front buffer to serve as the data of the currently displayed mouse cursor; the first image display control operation is performed to read the data of the currently display mouse cursor stored in the front buffer so as to display the corresponding mouse cursor on the display screen.

5. The image display method according to claim 1, wherein the step of loading the mouse cursor module further comprises:

initializing a width and a height of the mouse cursor to size of a predetermined number of pixels, respectively; and initializing a stretch window corresponding to the first image display control operation to a size of a resolution of the display screen.

6. The image display method according to claim 1, wherein the step of storing the source data of the mouse cursor layer corresponding to the mouse event in the memory, processing the source data of the mouse cursor layer, and storing the processed data of the mouse cursor layer in the memory further comprises:

determining a type of the mouse event; and processing the source data of the mouse cursor layer according to the type of the mouse event to generate the corresponding processed data of the mouse cursor layer and storing the processed data in the memory.

7. The image display method according to claim 6, wherein when it is determined that the type of the mouse event is a mouse cursor changing event, the step of processing the source data of the mouse cursor layer according to the type of the mouse event to generate the corresponding processed data of the mouse cursor layer and storing the processed data in the memory comprises:

forwarding predetermined source data corresponding to the mouse cursor changing event as the source data of the mouse cursor layer to a source buffer of the memory; and calculating a visible region of the mouse cursor layer according to parameters, and forwarding data of the visible region of the mouse cursor layer used as the processed data of the mouse cursor layer to a back buffer of the memory through an image rendering operation;

wherein, when the display screen is refreshed, the processed data of the mouse cursor layer stored in the back buffer is relocated to a front buffer to serve as data of the currently display mouse cursor; the first image display control operation reads the data of the currently display mouse cursor stored in the front buffer so as to display the updated mouse cursor on the display screen.

8. The image display method according to claim 6, wherein when it is determined that the type of the mouse event is a mouse cursor moving event, the step of processing the source data of the mouse cursor layer according to the type of the mouse event to generate the corresponding processed data of the mouse cursor layer and storing the processed data in the memory further comprises:

forwarding predetermined source data corresponding to the mouse cursor moving event used as the source data of the mouse cursor layer to a source buffer of the memory;

determining whether the mouse cursor moves at an edge position of the display screen;

when it is determined that the mouse cursor does not move at the edge position of the display screen, calculating actual position coordinates of the moved mouse cursor according to the source data of the mouse cursor layer, and setting a position of a cursor display window corresponding to the first image display control operation to the actual position coordinates of the moved mouse cursor to generate related data of the moved mouse cursor; and forwarding the related data of the moved mouse cursor used as the processed data of the mouse cursor layer to a back buffer of the memory through an image rendering operation;

wherein, when the display screen is refreshed, the processed data of the mouse cursor layer stored in the back buffer is relocated to a front buffer of the memory to serve as data of the currently display mouse cursor; the first image display control operation reads the data of the currently displayed mouse cursor from the front buffer so as to display a moving mouse cursor on the display screen.

9. The image display method according to claim 8, wherein when it is determined that the mouse cursor moves at the edge position of the display screen, the step of processing the source data of the mouse cursor layer to the type of the mouse event to generate the corresponding processed data of the mouse cursor layer and storing the corresponding processed data in the memory comprises:

calculating actual position coordinates and the visible region of the moved mouse cursor according to the source data of the mouse cursor layer, setting a position of a cursor display window corresponding to the first image display control operation to the actual position coordinates of the moved mouse cursor, and setting a size of the cursor display window to the visible region of the moved mouse cursor, so as to generate related data of the moved mouse cursor; and forwarding the generated related data of the moved mouse cursor used as the processed data of the mouse cursor layer to the back buffer through the image rendering operation.

10. The image display method according to claim 6, wherein when it is determined that the type of the mouse event is a mouse cursor hiding event, the step of processing the source data of the mouse cursor layer according to the type of the mouse event to generate the corresponding processed data of the mouse cursor layer and storing the processed data in the memory further comprises:
  closing a cursor display window corresponding to the first image display control operation.

11. The image display method according to claim 6, wherein when it is determined that the type of the mouse event is a mouse cursor displaying event, the step of processing the source data of the mouse cursor layer according to the type of the mouse event to generate the corresponding processed data of the mouse cursor layer and storing the processed data in the memory further comprises:
  opening a cursor display window corresponding to the first image display control operation.

12. The image display method according to claim 1 wherein when the display device operates in a 3D display mode, the step of processing the source data of the mouse cursor layer and storing the processed data of the mouse cursor layer in the memory comprises:
  corresponding to a 3D display type of the display device, generating a first viewing angle mouse cursor layer and a second viewing angle mouse cursor layer according to the source data of the mouse cursor layer, and respectively storing data of the first viewing angle mouse cursor layer and the second viewing angle mouse cursor layer in the memory, wherein the first viewing angle mouse cursor layer corresponds to a first viewing angle image and the second viewing angle mouse cursor layer corresponds to a second viewing angle image; and
  the step of performing the first image display control operation to read the processed data of the mouse cursor layer stored in the memory to display the corresponding mouse cursor on the display screen further comprises:
  when the first viewing angle image is refreshed, performing the first image display control operation to read the data of the first viewing angle mouse cursor layer stored in the memory to display a first viewing angle mouse cursor on the display screen;
  wherein the second viewing angle image is refreshed, performing the second image display control operation to read the data of the second viewing angle mouse cursor layer stored in the memory to display a second viewing angle mouse cursor on the display screen so as to further display a 3D mouse cursor on the display screen.

13. The image display method according to claim 12, wherein the 3D display type of the display device comprises a left-right mode and a top-bottom mode.

14. The image display method according to claim 13, wherein when the display device operates in the 3D display type of the top-bottom mode, widths of the first viewing angle mouse cursor layer and the second viewing angle mouse cursor layer are equal to a width of the mouse cursor layer generated by the display device operating in a 2D display mode, and heights of the first viewing angle mouse cursor layer and the second viewing angle mouse cursor layer are a half of a height of the mouse cursor layer generated by the display device operating in the 2D display mode.

15. The image display method according to claim 13, wherein when the display device operates in the 3D display type of the left-right mode, widths of the first viewing angle mouse cursor layer and the second viewing angle mouse cursor layer are a half of a width of the mouse cursor layer generated by the display device operating in a 2D display mode, and heights of the first viewing angle mouse cursor layer and the second viewing angle mouse cursor layer are equal to a height of the mouse cursor layer generated by the display device operating in the 2D display mode.

16. An Android platform based display device, connected to a display screen and coupled to a mouse, comprising:
  a monitoring circuit, monitoring a state of the mouse to acquire a corresponding mouse event;
  a graphics engine, connected to the monitoring circuit, creating a mouse cursor layer according to the acquired mouse event, and reporting a processing request of the mouse cursor layer to the display device;
  a processor, connected to the graphics engine, enabling an auxiliary processing thread in response to the reported processing request of the mouse cursor layer, the processor further reading source data of the mouse cursor layer from a memory, processing the source data of the mouse cursor layer, and storing the processed data of the mouse cursor layer in the memory; and
  a first image display control module, connected to the processor, reading the processed data of the mouse cursor layer from the memory so as to display a corresponding mouse cursor on the display screen;
  a second image display control module, connected to the processor;
  wherein the graphics engine further creates a processing request of a display image layer according to display image data received by the display device, and reports the processing request of the display image layer to a message queue of a main thread of the processor; the processor further sequentially processes data of the display image layer according to the processing request in the message queue of the main thread thereof, and stores the processed data of the display image layer in the memory; and
  wherein the second image display control module sequentially reads the data of the display image layer stored in the memory so as to display a corresponding image on the display screen; and
  wherein the first image display control module and the second image display control module are mutually independent.

17. The display device according to claim 16, wherein the memory is configured in advance with three shared buffer units having a predetermined size for storing data of the mouse cursor, and the three buffer units comprise:
  a source buffer, storing source data of the mouse cursor layer;
  a back buffer, storing processed source data of the mouse cursor layer generated from processing the source data of the mouse cursor layer; and
  a front buffer, storing data of a currently display mouse cursor;
  wherein, when the display screen is refreshed, the processed data of the mouse cursor layer stored in the memory is relocated to the front buffer to serve as the data of the currently display mouse cursor; and the first image control module is invoked to read the data of the currently display mouse cursor stored in the front buffer so as to display the corresponding mouse cursor on the display screen.

* * * * *